June 27, 1950 A. R. WYLIE 2,513,226
FIELD STRUCTURE FOR ROTATING ELECTRICAL EQUIPMENT
Filed July 11, 1945 3 Sheets-Sheet 2
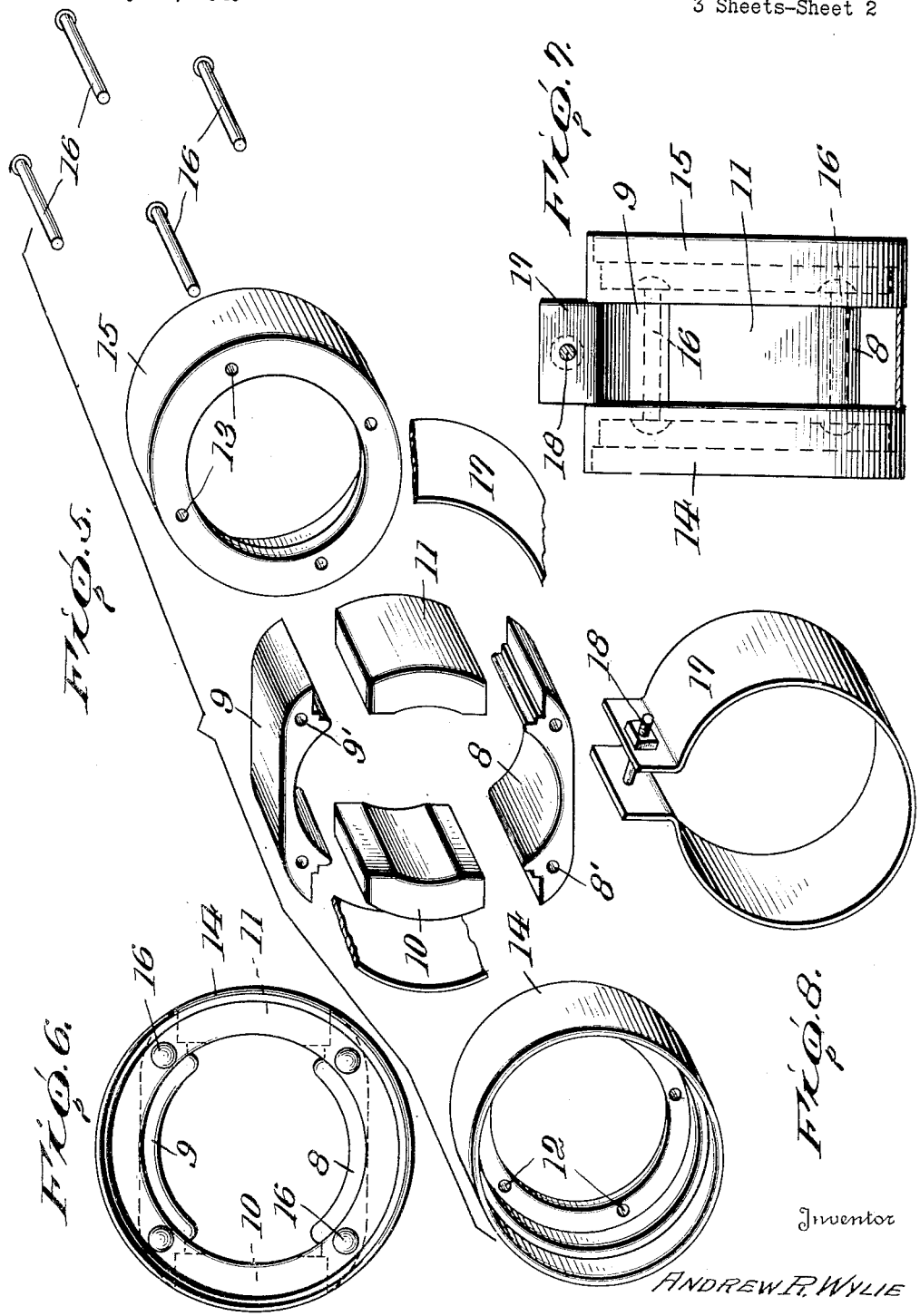
Inventor
ANDREW R. WYLIE
By Patterson, Wright & Pallister
Attorneys

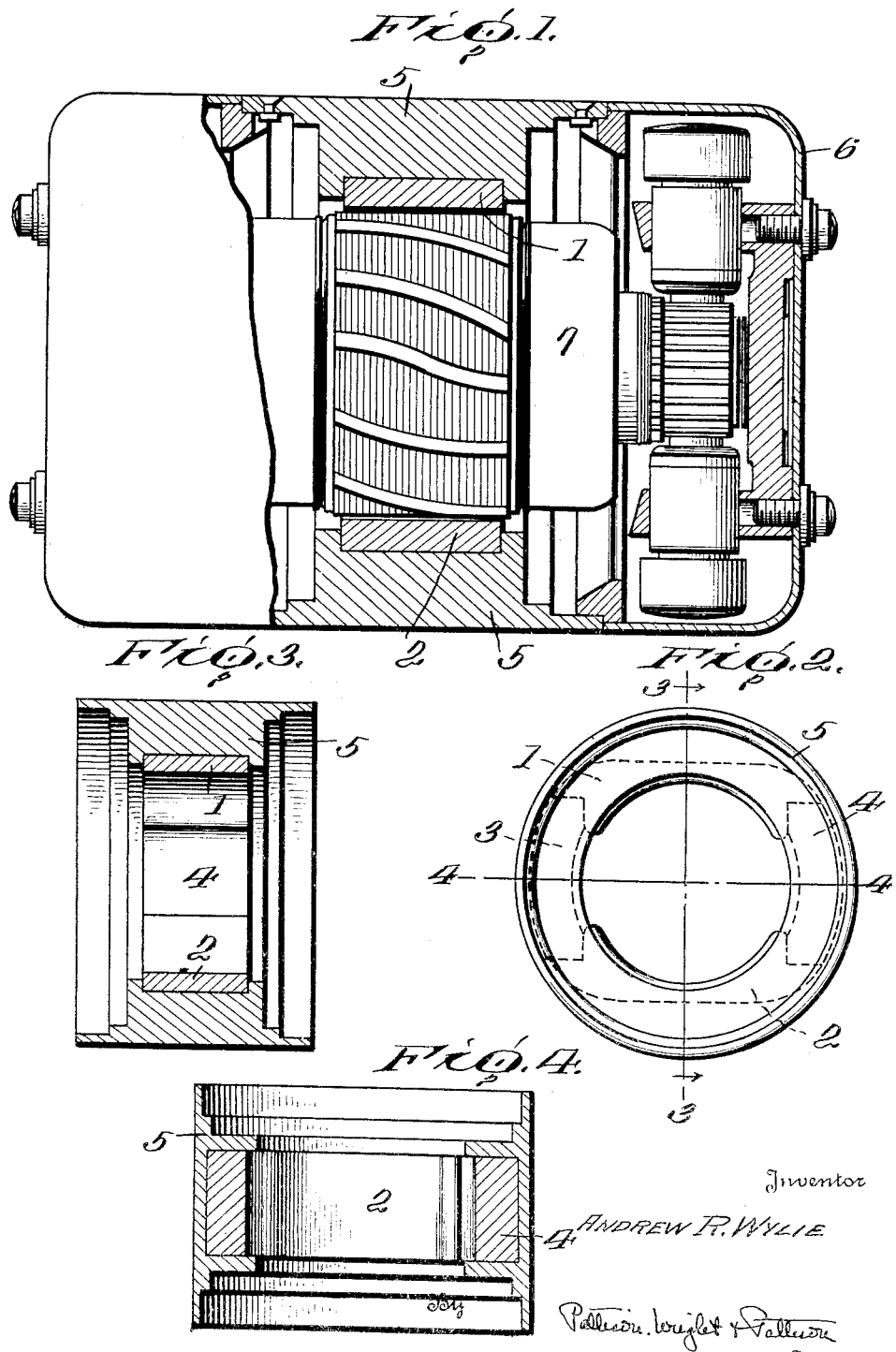

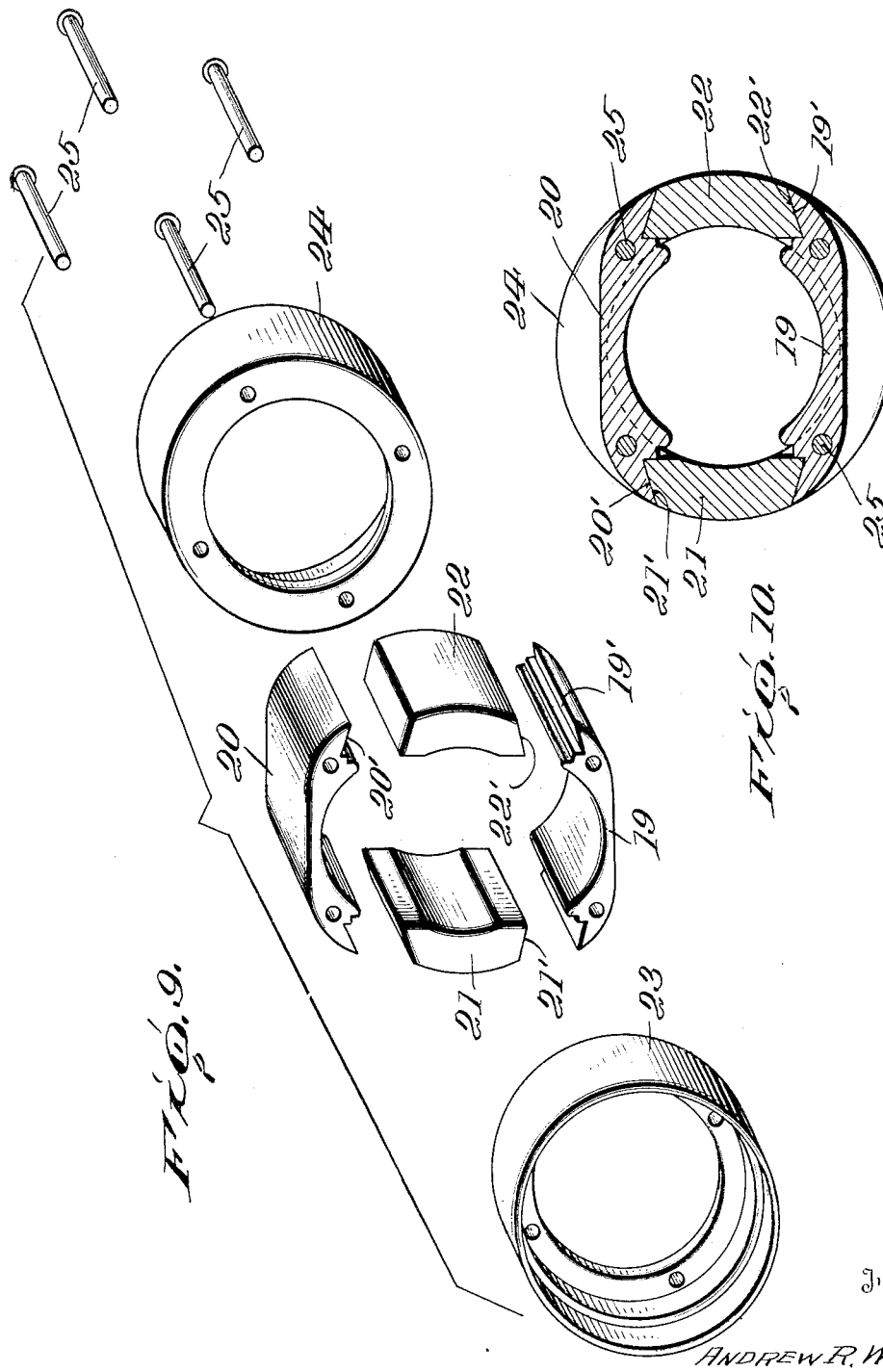

Patented June 27, 1950

2,513,226

UNITED STATES PATENT OFFICE 2,513,226

FIELD STRUCTURE FOR ROTATING ELECTRICAL EQUIPMENT

Andrew R. Wylie, Owosso, Mich., assignor, by mesne assignments, to Redmond Company, Inc., Owosso, Mich., a corporation of Michigan Application July 11, 1945, Serial No. 604,342

5 Claims. (Cl. 171—252)

This invention relates to certain new and useful improvements in rotating electrical equipment such as magnetos, electric motors, generators and the like, and more particularly to a field structure thereof, the object being to provide a segmental field assembly composed of soft iron pole segments and magnetic field segments formed of permanent magnet material such as Alnico, assembled in contact with one another in such a manner that a very strong and durable field structure is formed without machining or perforating the segments formed of permanent magnet material.

Another object of my invention is to provide novel means for holding the sections of iron and permanent magnet material together so as to prevent lateral and radial movement of the sections in respect to one another.

A further object of my invention is to provide a field structure in which the weight is reduced to a minimum and yet the reliability is retained to the maximum.

My invention enables the use of a fragile permanent magnet material such as Alnico in the field assembly of electrical rotating equipment without any danger of the magnetic field sections being injured in constructing, assembling and in using the same under severe conditions.

In the drawings:

Fig. 1 is a side elevation partly in section of a dynamotor showing my improved construction of field structure in position.

Fig. 2 is an end elevational view of the field structure, showing the pole sections and the magnetic field sections in dotted lines.

Fig. 3 is a vertical cross-sectional view through the field structure, substantially on the line 3—3 of Fig. 2, showing the non-magnetic casting for holding the segments in contact with one another.

Fig. 4 is a section taken on line 4—4 of Fig. 2.

Fig. 5 is a view in perspective of another form of field structure, the parts being separated from their assembled relationship and shown expanded away from each other.

Fig. 6 is an end elevation of the field structure showing the pole sections and magnetic field sections in dotted line.

Fig. 7 is a side elevation of the field structure showing the parts in their assembled position.

Fig. 8 is a detailed perspective of the band encircling the pole and magnetic field sections for holding the sections together under compression.

Fig. 9 is a perspective view of a plurality of pole sections and magnetic field sections showing the abutting ends provided with inclined surfaces for interlocking said sections together to prevent radial movement.

Fig. 10 is a transverse vertical cross-sectional view, taken centrally of the assembly produced from the parts illustrated in Fig. 9.

In the embodiment of my invention as shown in Figs. 1 to 4, the field structure is composed of pole segments 1 and 2 formed of soft iron of high permeability, low retentivity iron and magnetic field segments 3 and 4 formed of a permanent magnet material such as Alnico. Having abutting ends the segments 1 and 2 are provided with seats for the ends of the segments 3 and 4 so that when these segments are arranged in contact with one another a circular structure is formed. In order to hold the segments in their proper assembled position with their ends closely in contact with one another I cast around the segments a housing 5 of non-magnetic casting material said housing forming a part of and the central frame of a casing of a dynamotor. As clearly shown in Fig. 1, the parts or sections of the field structure are provided with curved inner and outer faces to cooperate with a conventional construction of armature 7 passing through the center of the assembly.

In the construction shown in Figs. 5 to 8, the field structure is composed of pole segments 8 and 9 provided with seats at each end to receive the magnetic field segments 10 and 11. The segments 8 and 9 are provided with apertures 8', 9' adapted to register with apertures 12 and 13 formed in flanged end plates 14 and 15 and through which rivets 16 are adapted to pass and be secured so as to hold the permanent magnetic segments 10 and 11 between the pole segments 8 and 9 without piercing or distorting the permanent segments 10 and 11 in any way. This construction enables permanent magnet segments to be molded or cast and used without machining or drilling holes therein.

In order to hold these segments in assembled position under compression I employ a band 17 encircling the segments and having its ends secured together by a screw 18 so that by tightening the band the permanent magnet segments will be held against radial movement and under tight compression.

When the field structure thus formed has been assembled it can be readily placed in an electric motor or the like and forms a casing support.

In the construction of Fig. 9 the segmental pole pieces 19 and 20 are provided with beveled seats 19', 20', and the segments 21 and 22 formed of permanent magnet material are provided with beveled ends 21', 22' cooperating with the beveled seats of the pole segments so that when these segments are assembled the inclined surfaces are brought into contact with one another in order to prevent radial movement of the segments when they are assembled and held together by end plates, as will be later described. Flanged end plates 23 and 24 are employed which are provided with apertures registering with apertures formed in the pole segments and through which rivets 25 pass and are secured so as to hold the segments under compression in the proper assembled position. This construction can be used with or without an encircling band and as shown the band has been dispensed with as I have found in practice that the construction disclosed will stand the strain and stresses and the parts will be held in assembled position without any danger of the parts working loose by vibration.

In the specification I have shown and described three forms of field structure in all of which permanent magnet material is used for forming two of the opposing segments and the other two segments forming two opposing pole segments, and it is of course understood that this construction is to be used in a two-pole machine and that the field structure can be formed of any number of segments with the pole segments and the permanent magnet material segments alternately arranged so that the pole segments will be opposite one another and the permanent magnet material segments will be opposite one another.

While in the specification I have used the term "soft iron" in designating the material used in forming the field poles these segments can be formed of low retentive iron, and that while Alnico has been used to designate the specific material used in forming the permanent magnet segments any permanent magnet material can be employed, and I wish it to be clearly understood that I do not wish to limit myself to the use of either of the materials specified as other material can be used without departing from the spirit of my invention in forming these segments of a field structure for rotating electrical equipment.

From the foregoing description it will be seen that I have provided a sectional field structure for rotating electrical equipment in which permanent magnet material is employed so as to dispense with field coils, the sections of permanent magnet material being so constructed and arranged and held in assembled position that the segments are not injured in assembling or in use and yet a strong and durable field structure is provided.

The segments forming the field structure as here shown are provided with curved inner walls to form a circular field structure to receive an armature field assembly and the seats of the pole segments are provided with shoulders to prevent inward movement of the segments of permanent magnet material when the segments are interlocked together, and in the embodiment of my invention where inclined faces are used an interlocking connection is formed which prevents inward and outward movement.

In all of the embodiments shown and described the enclosing means such as the casting, end members and band, are formed of nonmagnetic material and these parts hold the field structure composed of the pole pieces and pieces of permanent magnet material in close contact with one another.

Although three specific embodiments of the invention have been illustrated and described herein, the claims of this application are directed to the particular embodiment illustrated in Figs. 5 to 8 inclusive. For claims directed specifically to the embodiment of the invention illustrated in Figs. 1 to 4 inclusive, and for claims generic to all embodiments, reference is to be had to my co-pending divisional application No. 163,702, filed May 23, 1950.

I claim:

1. A sectional field structure composed of a plurality of separate and distinct segments of soft iron and of permanent magnet material alternately arranged with their ends in contact with one another to form a field structure to receive an armature assembly of a motor or the like, and plates disposed at each side of said segments, fastening members passing through said end plates and soft iron segments for holding said segments in assembled position against lateral movement, and means encircling said segments for holding said segments against radial movement.

2. A sectional field structure composed of a plurality of separate and distinct segments of soft iron and of permanent magnet material alternately arranged with their ends in contact with one another to form a field structure to receive an armature assembly of a motor or the like, end plates disposed at each side of said segments, fastening members passing through said end plates and soft iron segments for holding said segments in assembled position against lateral movement, and a band encircling said segments for holding said segments against radial movement.

3. A sectional field structure composed of separate and distinct segments having curved inner faces with ends abutting one another, the alternate sections being formed of soft iron and permanent magnet material, and means enclosing said segments formed of nonmagnetic material comprising end plates, and a band for holding said segments in close contact with one another under compression.

4. A field structure for electrical rotating equipment having a rotating armature structure, the field structure being composed of separate and distinct pole segments of soft iron and separate and distinct magnetic field segments of permanent magnet material, the inner faces of all of said segments being shaped to conform to the contour of the rotating armature, the ends of the segments being formed for wedging engagement so that their ends are in engagement with one another to form a circular field structure, and non-magnetic means disposed on each side of said segments for holding the interlocking ends of said segments together.

5. A field structure for electrical rotating equipment having a rotating armature structure, the field structure being composed of separate and distinct pole segments of soft iron, separate and distinct magnetic field segments of permanent magnet material having their abutting ends interlocked together to form a circular structure, the inner faces of all of said segments being shaped to conform to the contour of the rotating armature, the segments of soft iron being arranged opposite one another, and means engaging said segments for holding said segments in assembled position under compression.

ANDREW R. WYLIE.

REFERENCES CITED

The following references are of record in the file of this patent:

UNITED STATES PATENTS

| Number | Name | Date |
|---|---|---|
| 1,405,536 | Milton | Feb. 7, 1922 |
| 1,422,154 | Watson | July 11, 1922 |
| 2,048,161 | Klaiber | July 21, 1936 |

FOREIGN PATENTS

| Number | Country | Date |
|---|---|---|
| 366,591 | Italy | Jan. 3, 1939 |
| 771,677 | France | Oct. 13, 1934 |
| 784,014 | France | July 20, 1935 |